United States Patent
Huang et al.

(10) Patent No.: US 11,990,130 B2
(45) Date of Patent: May 21, 2024

(54) METHOD, APPARATUS, DEVICE AND COMPUTER STORAGE MEDIUM FOR PROCESSING VOICES

(71) Applicant: BAIDU ONLINE NETWORK TECHNOLOGY (BEIJING) CO., LTD., Beijing (CN)

(72) Inventors: Jizhou Huang, Beijing (CN); Shiqiang Ding, Beijing (CN); Changshun Hou, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 531 days.

(21) Appl. No.: 17/278,214

(22) PCT Filed: May 7, 2020

(86) PCT No.: PCT/CN2020/088971
§ 371 (c)(1),
(2) Date: Mar. 19, 2021

(87) PCT Pub. No.: WO2021/047197
PCT Pub. Date: Mar. 18, 2021

(65) Prior Publication Data
US 2021/0350805 A1    Nov. 11, 2021

(30) Foreign Application Priority Data
Sep. 12, 2019   (CN) .......................... 201910862424.1

(51) Int. Cl.
*G10L 15/26* (2006.01)
*G10L 15/30* (2013.01)

(52) U.S. Cl.
CPC .............. *G10L 15/26* (2013.01); *G10L 15/30* (2013.01)

(58) Field of Classification Search
CPC .......... G10L 15/22; G10L 15/26; G10L 15/30
See application file for complete search history.

(56) References Cited

U.S. PATENT DOCUMENTS 6,748,426 B1 *   6/2004  Shaffer .................... G10L 15/30
                                                  704/E15.047
10,354,653 B1 *  7/2019  Vijayvergia ............ G10L 15/26
(Continued)

FOREIGN PATENT DOCUMENTS

CN        101079885 A      11/2007
CN        103488384 A       1/2014
(Continued)

OTHER PUBLICATIONS

International Search Report and Written Opinion, PCT Application No. PCT/CN2020/088971, mailed Aug. 11, 2020, 11 pages.
(Continued)

*Primary Examiner* — Eric Yen
(74) *Attorney, Agent, or Firm* — Kwan & Olynick LLP

(57) ABSTRACT

A method, apparatus, device and computer storage medium for processing voices, which relate to the technical field of voices, are disclosed. An implementation includes: recognizing a voice request received by a first voice assistant to obtain a text request; determining information of a second voice assistant which is able to process the text request; and calling the second voice assistant to respond to the text request.

14 Claims, 8 Drawing Sheets

(56) References Cited

U.S. PATENT DOCUMENTS

| | | | |
|---|---|---|---|
| 11,425,215 B1* | 8/2022 | Lewis | G06F 9/4881 |
| 2012/0036563 A1 | 2/2012 | Glasgow et al. | |
| 2014/0222436 A1* | 8/2014 | Binder | G10L 21/16 |
| | | | 704/275 |
| 2014/0244712 A1* | 8/2014 | Walters | H04L 67/10 |
| | | | 709/202 |
| 2014/0337022 A1* | 11/2014 | Liu | G10L 15/30 |
| | | | 704/231 |
| 2015/0248885 A1* | 9/2015 | Koulomzin | G10L 15/08 |
| | | | 704/251 |
| 2016/0259656 A1* | 9/2016 | Sumner | G06F 3/167 |
| 2016/0358607 A1 | 12/2016 | Dykstra-Erickson et al. | |
| 2017/0372703 A1 | 12/2017 | Sung et al. | |
| 2018/0247654 A1 | 8/2018 | Bhaya et al. | |
| 2019/0172452 A1* | 6/2019 | Smith | G10L 15/30 |
| 2019/0172465 A1 | 6/2019 | Lee et al. | |
| 2019/0251960 A1* | 8/2019 | Maker | G10L 15/22 |
| 2021/0133609 A1* | 5/2021 | Lee | G06F 16/433 |
| 2021/0193132 A1* | 6/2021 | Hanes | G06F 16/3343 |
| 2021/0272566 A1* | 9/2021 | Li | G06F 3/167 |
| 2022/0293099 A1* | 9/2022 | Lee | G10L 15/22 |

FOREIGN PATENT DOCUMENTS

| | | |
|---|---|---|
| CN | 104462478 A | 3/2015 |
| CN | 105227656 A | 1/2016 |
| CN | 107196950 A | 9/2017 |
| CN | 107689870 A | 2/2018 |
| CN | 107919123 A | 4/2018 |
| CN | 108304153 A | 7/2018 |
| CN | 108804711 A | 11/2018 |
| CN | 109474843 A | 3/2019 |
| CN | 109617907 A | 4/2019 |
| CN | 109697979 A | 4/2019 |
| CN | 109878434 A | 6/2019 |
| CN | 110018858 A | 7/2019 |
| CN | 110718218 A | 1/2020 |
| CN | 110718219 A | 1/2020 |
| EP | 1791053 A1 | 5/2007 |
| EP | 3480816 A2 | 5/2019 |
| IN | 109087639 A | 12/2018 |
| JP | 2003295890 A | 10/2003 |
| JP | 2008532119 A | 8/2008 |
| JP | 2018532151 A | 11/2018 |
| WO | 2014203495 A1 | 12/2014 |
| WO | 2019035371 A1 | 2/2019 |

OTHER PUBLICATIONS

U.S. Appl. No. 17/278,058, entitled "Method and Apparatus for Processing Voices, Device and Computer Storage Medium", filed Mar. 19, 2021.

International Search Report and Written Opinion, PCT Application No. PCT/CN2020/088943, mailed Aug. 12, 2020, 11 pages.

Office Action, List of references cited in CN Application No. 2019108624241, mailed Aug. 30, 2021, 3 pages.

Office Action, CN Application No. 2019108624241, mailed Sep. 3, 2021, 17 pages.

European Search Report for EP App. No. 20861999.9, dated Feb. 25, 2022, 9 pages.

Japanese First Office Action for App. No. JP2021-501274, 1 page.

\* cited by examiner

METHOD, APPARATUS, DEVICE AND COMPUTER STORAGE MEDIUM FOR PROCESSING VOICES

This application is a national application and, pursuant to 35 U.S.C. § 371, is entitled to and claims the right of priority based on PCT Application No. PCT/CN2020/088971, filed May 7, 2020, which claims priority to Chinese Patent Application No. CN201910862424.1, entitled "Method, Apparatus, Device and Computer Storage Medium for Processing Voices", filed on Sep. 12, 2019, all of which are incorporated by reference in their entirety.

TECHNICAL FIELD

The present application relates to the technical field of computer applications, and particularly to a method, apparatus and a computer storage medium for processing voices in a voice technology.

BACKGROUND

This section is intended to provide a background or context for implementations of the present disclosure which are recited in the claims. The description herein is not admitted to be the prior art by inclusion in this section.

With the rapid development of voice recognition technologies, voice assistants are favored by various mobile phone application providers and mobile phone users. The user may interact with the voice assistant by means of inputting a voice request, and after recognizing the voice request, the voice assistant performs a corresponding processing task and responds to the user.

However, when using the voice assistant, the user may face the technical problem that since the current voice assistant is not specialized when parsing the voice requests in some fields, a response provided for the user is unable to meet requirements of the user.

SUMMARY

In view of this, the present application provides a method, apparatus and computer storage medium for processing voices, so as to meet requirements of a user more accurately when the user uses a voice assistant.

In a first aspect, the present application provides a method for processing voices, including:

recognizing by a server of a first voice assistant, a voice request received by the server of the first voice assistant;

sending a text request obtained by the recognition to a server of at least one other voice assistant;

determining information of a second voice assistant from the server of the other voice assistant which returns acknowledgment information, the acknowledgment information indicating that the server of the other voice assistant which sends the acknowledgment information is able to process the text request; and sending the text request and the information of the second voice assistant to a client of the first voice assistant, such that the client of the first voice assistant calls a client of the second voice assistant to respond to the text request.

According to a preferred implementation of the present application, the method further includes:

receiving token information returned by a server of the second voice assistant for the text request; and sending the token information to the client of the first voice assistant, such that the client of the first voice assistant transfers the text request and the token information when calling the client of the second voice assistant.

According to a preferred implementation of the present application, the method further includes: receiving an information list of voice assistants installed in a terminal device sent by the client of the first voice assistant; and according to the information list of the voice assistants, performing the sending the text request obtained by the recognition to the server of at least one other voice assistant.

According to a preferred implementation of the present application, the method further includes: before sending the text request obtained by the recognition to the server of at least one other voice assistant, judging whether the server of the first voice assistant is able to process the text request, if the server of the first voice assistant is not able to process the text request, proceeding to the sending the text request to the server of at least one other voice assistant, and if the server of the first voice assistant is able to process the text request, responding to the text request and returning a response result to the client of the first voice assistant.

According to a preferred implementation of the present application, the determining information of the second voice assistant from the server of the other voice assistant which returns acknowledgment information includes:

if there is only one server of the other voice assistant which returns the acknowledgment information, determining the information of the voice assistant corresponding to the server as the information of the second voice assistant; and if there are a plurality of servers of the other voice assistants which return the acknowledgment information, selecting the information of the voice assistant corresponding to one of the servers as the information of the second voice assistant.

In a second aspect, the present application provides a method for processing voices, including:

sending, by a client of the first voice assistant, a voice request to a server of a first voice assistant;

receiving, from the server of the first voice assistant, a text request obtained by recognizing the voice request by the server of the first voice assistant, and information of a second voice assistant which is able to process the text request; and calling a client of the second voice assistant to respond to the text request by the client of the second voice assistant.

According to a preferred implementation of the present application, the method further includes:

receiving, by the client of the first voice assistant, token information returned by the server of the first voice assistant, the token information being generated by a server of the second voice assistant for the text request; and transferring the text request and the token information while calling the client of the second voice assistant.

According to a preferred implementation of the present application, the method further includes:

scanning, by the client of the first voice assistant, an information list of voice assistants installed in a terminal device; and sending the information list of the voice assistants to the server of the first voice assistant.

In a third aspect, the present application provides a method for processing voices, including:

after receiving, by a client of a second voice assistant, a call from a client of a first voice assistant, sending, by the client of the second voice assistant, a text request transferred by the call to a server of the second voice assistant; and receiving a response result returned by the server of the second voice assistant for the text request.

According to a preferred implementation of the present application, token information is also transferred in the call;

the token information along with the text request are sent to the server of the second voice assistant, such that the server of the second voice assistant performs authentication using the token information.

In a fourth aspect, the present application provides a method for processing voices, including:

receiving, by a server of a second voice assistant, a text request sent by a server of a first voice assistant, the text request being obtained by recognizing a voice request by the server of the first voice assistant;

returning acknowledgment information to the server of the first voice assistant, the acknowledgment information indicating that the server of the second voice assistant is able to process the text request;

receiving the text request sent by a client of the second voice assistant; and responding to the text request, and returning a response result of the text request to the client of the second voice assistant.

According to a preferred implementation of the present application, the method further includes: generating token information for the text request, and sending the token information to the server of the first voice assistant;

before responding to the text request, the method further includes:

performing authentication using the token information received along with the text request and the token information generated for the text request, and if the authentication is passed, continuing to respond to the text request.

According to a preferred implementation of the present application, responding to the text request includes:

parsing the text request into a task instruction, and executing a corresponding task processing operation according to the task instruction; or parsing the text request into a task instruction, and returning the task instruction and information of a non-voice assistant executing the task instruction to the client of the second voice assistant, such that the client of the second voice assistant calls a client of the non-voice assistant to execute the task instruction.

In a fifth aspect, the present application provides an apparatus for processing voices provided at a server of a first voice assistant, the apparatus including:

a client interaction unit configured to receive a voice request sent by a client of the first voice assistant;

a recognition unit configured to recognize the voice request to obtain a text request; and a server interaction unit configured to send the text request to a server of at least one other voice assistant; and determine information of a second voice assistant from the server of the other voice assistant which returns acknowledgment information, the acknowledgment information indicating that the server of the other voice assistant which sends the acknowledgment information is able to process the text request;

wherein the client interaction unit is further configured to send the text request and the information of the second voice assistant to the client of the first voice assistant, such that the client of the first voice assistant calls a client of the second voice assistant to respond to the text request.

In a sixth aspect, the present application provides an apparatus for processing voices provided at a client of a first voice assistant, the apparatus including:

a server interaction unit configured to send a voice request to a server of the first voice assistant; and receive a text request which is returned by the server of the first voice assistant and obtained by recognizing the voice request and information of a second voice assistant which is able to process the text request; and a client interaction unit configured to call a client of the second voice assistant to respond to the text request by the client of the second voice assistant.

In a seventh aspect, the present application provides an apparatus for processing voices provided at a client of a second voice assistant, the apparatus including:

a client interaction unit configured to receive a call from a client of a first voice assistant; and a server interaction unit configured to send a text request transferred by the call to a server of the second voice assistant; and receive a response result returned by the server of the second voice assistant for the text request.

In an eighth aspect, the present application provides an apparatus for processing voices provided at a server of a second voice assistant, the apparatus including:

a server interaction unit configured to receive a text request sent by a server of a first voice assistant, the text request being obtained by recognizing a voice request by the server of the first voice assistant; and return acknowledgment information to the server of the first voice assistant, the acknowledgment information indicating that the server of the second voice assistant is able to process the text request;

a client interaction unit configured to receive the text request sent by a client of the second voice assistant; and a response processing unit configured to respond to the text request;

wherein the client interaction unit is further configured to return a response result of the text request to the client of the second voice assistant.

In a ninth aspect, the present application provides an electronic device, including:

at least one processor; and a memory connected with the at least one processor communicatively;

wherein the memory stores instructions executable by the at least one processor to cause the at least one processor to carry out the above-mentioned method.

In a tenth aspect, the present application provides a non-transitory computer readable storage medium including instructions, which, when executed by a computer, cause the computer to carry out the above-mentioned methods.

In an eleventh aspect, the present application provides a method for processing voices, including:

recognizing a received voice request by a first voice assistant to obtain a text request;

determining information of a second voice assistant which is able to process the text request; and calling the second voice assistant to respond to the text request, wherein the responding to the text request includes: parsing the text request to obtain a task instruction.

DETAILED DESCRIPTION OF EMBODIMENTS

The following part will illustrate exemplary embodiments of the present application with reference to the figures, including various details of the embodiments of the present application for a better understanding. The embodiments should be regarded only as exemplary ones. Therefore, those skilled in the art should appreciate that various changes or modifications can be made with respect the embodiments described herein without departing from the scope and spirit of the present application. Similarly, for clarity and conciseness, the descriptions of the known functions and structures are omitted in the descriptions below.

Figure 1:
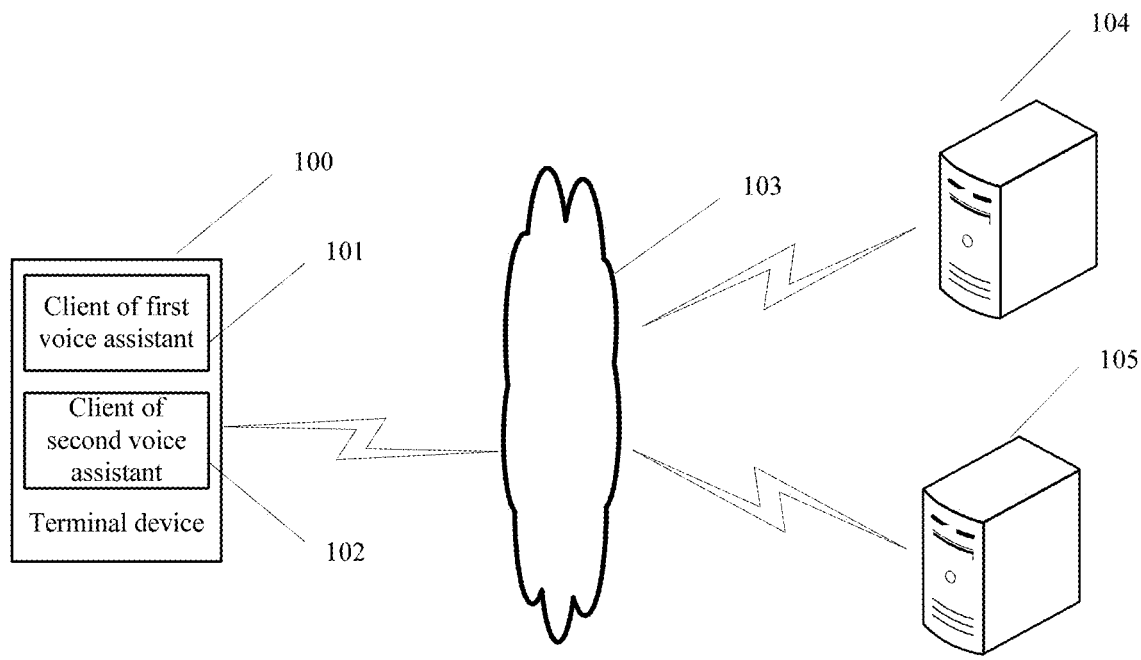
FIG. 1 shows an exemplary system architecture to which a method or apparatus for processing voices according to embodiments of the present application may be applied.

FIG. 1 shows an exemplary system architecture to which a method or apparatus for processing voices according to embodiments of the present application may be applied.

As shown in FIG. 1, the system architecture may include a client 101 of a first voice assistant and a client 102 of a second voice assistant in a terminal device 100, a network 103, a server 104 of the first voice assistant, and a server 105 of the second voice assistant. The network 103 serves as a medium for providing communication links between the terminal device 100 and the servers 104, 105. The network 103 may include various connection types, such as wired and wireless communication links, or fiber-optic cables, or the like.

A user may use the terminal device 100 to interact with the servers 104, 105 through the network 103. Various clients may be installed on the terminal device 100, and in addition to the voice-assistant client shown in FIG. 1, a client, such as a web browser, a communication application, or the like, may be installed. In addition, it should be noted that the number of the voice-assistant clients in the terminal device 100 shown in the present application is only illustrative, is not limited to two, and may be more than two. The voice-assistant client in the present application may be configured as a client having only a voice assistant function, or a client in which a voice assistant function and other functions are fused, for example, a map application client with a voice assistant function, a search application client with a voice assistant function, a video playing client with a voice assistant function, or the like. The client may be configured as a built-in client of an operating system or a client installed by the user.

The terminal device 100 may be configured as various electronic devices supporting voice interaction, and may be configured as a screen device or a non-screen device, including, but not limited to, smart phones, tablets, intelligent loudspeaker boxes, smart televisions, or the like. The apparatus for processing voices according to the present application may be provided and run in the above-mentioned terminal device 100. The apparatus may be implemented as a plurality of pieces of software or a plurality of software modules (for example, for providing distributed service), or a single piece of software or a single software module, which is not specifically limited herein.

Each of the servers 104, 105 may be configured as a single server or a server group including a plurality of servers. In the present application, the servers 104, 105 are configured to receive and respond to information from respective clients, and information interaction also exists between the servers 104, 105.

It should be understood that the numbers of the terminal devices, the network, and the server in FIG. 1 are merely schematic. There may be any number of terminal devices, networks and servers as desired for an implementation.

In the prior art, when the user uses the first voice assistant, after the client of the first voice assistant sends a voice request input by the user to the server of the first voice assistant, the server of the first voice assistant is responsible for performing voice recognition and an instruction parsing operation on the voice request, the voice recognition includes recognizing the voice request into a text request, and the instruction parsing operation includes parsing the text request into a task instruction in conjunction with a preset parsing policy. Then, a corresponding task processing operation is performed according to the task instruction. Usually, the instruction parsing operation is deeply related to a specific field, and only a specialized voice assistant in the related field may well perform the instruction parsing operation on a text request in this field.

For example, when using a built-in voice assistant of a mobile phone system, the user inputs a voice request "to wucaicheng first and then to Tsinghua University", but after the voice request is recognized into a text, the built-in voice assistant of the mobile phone system has difficulty in converting the text into a correct task instruction. The text is parsed into task instruction "initiating route retrieval with the Tsinghua University as a destination", but the passing wucaicheng is lost. Even if the built-in voice assistant of the mobile phone system calls a client of a navigation or map application in response to the task instruction, and the navigation or map client executes the task instruction, requirements of the user are unable to be met correctly.

After research, the inventors of the present application find that usually, the voice assistant is able to well complete a catching link (that is, a voice instruction may be well recognized into a text instruction), but a more specialized client is required in an understanding link (that is, the text instruction is parsed into the task instruction). In view of this, the core idea of the present application is that when the user inputs the voice request using the first voice assistant, the catching link is still performed by the first voice assistant, but the understanding link and a performing link are performed by the second voice assistant which is able to process the text request corresponding to the voice request. The method according to the present application will be described below in conjunction with embodiments.

Figure 2:
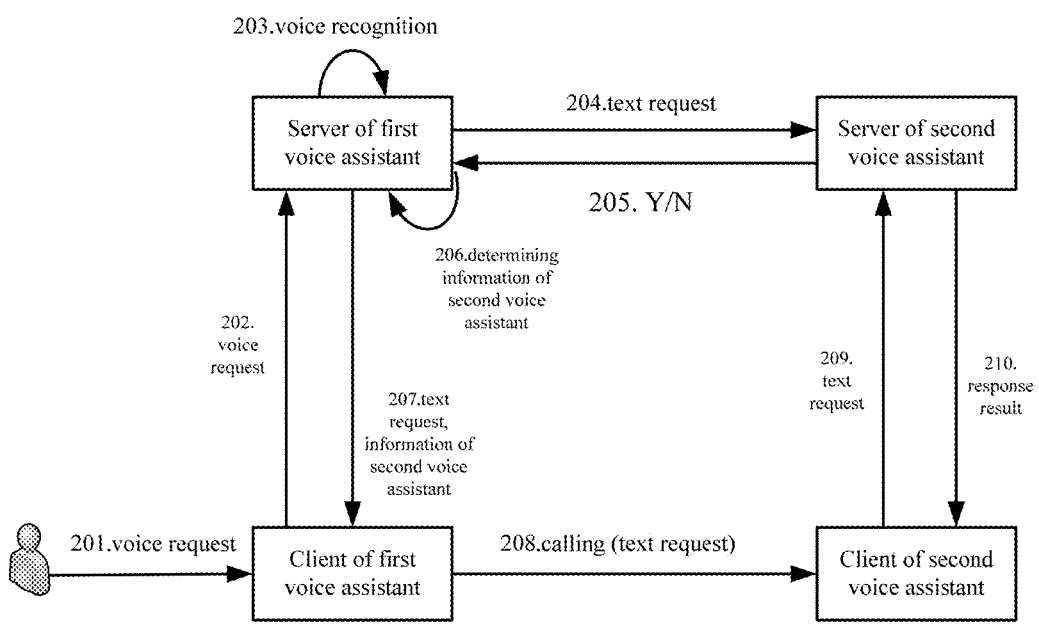
FIG. 2 is a flow chart of a main method according to an embodiment of the present application.

FIG. 2 is a flow chart of a main method according to an embodiment of the present application, and the method has an application scenario that at least a client of a first voice assistant and a client of a second voice assistant are installed in a terminal device used by a user. As shown in FIG. 2, the method may include the following steps:

in 201, receiving, by the client of the first voice assistant, a voice request input by the user.

In this step, the user inputs the voice request when using the client of the first voice assistant, or the first voice assistant is activated by a wakeup word used when the user inputs the voice request, such that the client of the first voice assistant receives the voice request input by the user.

For example, assuming that the user inputs the voice request by pressing a record button while using the client of the first voice assistant, the client of the first voice assistant receives the voice request input by the user.

For another example, assuming that the user starts a client of a built-in voice assistant of a system and inputs the voice request while using a mobile phone, the client of the built-in voice assistant of the system receives the voice request.

For another example, assuming that the user inputs the voice request "Duer . . . " while using the Baidu map, the wakeup word "Duer" awakes a built-in voice assistant of the Baidu map, and a client of the Baidu map receives the voice request input by the user.

Certainly, this step is also applicable to other scenarios which are not enumerated here.

In 202, sending, by the client of the first voice assistant, the voice request to a server of the first voice assistant.

In 203, recognizing the voice request by the server of the first voice assistant to obtain a corresponding text request.

Currently, most voice assistants may well perform voice recognition, and therefore, after receiving the voice request, the server of the first voice assistant recognizes the voice request to obtain the corresponding text request.

In 204, sending, by the server of the first voice assistant, the text request to a server of at least one other voice assistant.

Preferably, before this step, the server of the first voice assistant may first determine whether the server is able to process the text request, and if yes, directly respond to the text request, that is, parse the text request to obtain a task instruction. The subsequent process is the same as the prior art. If the server is unable to process the text request, the step of distributing the text request to the server of the other voice assistant is executed.

Whether the text request is able to be processed may be judged according to the field of the server, for example, the field of the text request is determined by simply analyzing the text request based on keywords or semantics, and whether the field of the text request is consistent with the field of the server is judged, if yes, it is considered that the server is able to process the text request, otherwise, it is considered that the server is unable to process the text request. Other field recognition ways may be adopted.

As one implementation, the server of the first voice assistant may be preconfigured with information of other cooperative voice assistants, and then send the text request to the servers of these voice assistants respectively.

As another implementation, the client of the first voice assistant may scan an information list of voice assistants installed in the terminal device. Corresponding information may be adopted in an installation package to indicate voice assistant information of a client of each voice assistant in the terminal device, and the client of the first voice assistant may determine the clients of the voice assistants installed in the terminal device with the installation package in the terminal device, thereby obtaining the information list of the installed voice assistants. Then, the client of the first voice assistant may upload the information list of the voice assistants to the server of the first voice assistant. The information list may be uploaded when the client of the first voice assistant is started, while the voice request is sent, or before the voice request is sent. In this step, the server of the first voice assistant may send the text request to the servers of the voice assistants in the list according to the information list of the voice assistants uploaded by the client of the first voice assistant.

In 205, after determining by the server of each other voice assistant that it is able to process the text request, returning acknowledgment information to the server of the first voice assistant.

The server of each other voice assistant receiving the text request may also determine whether the server is able to process the text request in the above-mentioned manner based on the field recognition. After determining that the server itself is able to process the text request, the server returns the acknowledgment information to the server of the first voice assistant. If the server determines that the server itself is unable to process the text request, no response may be generated, or negative acknowledgment information may be returned to the server of the first voice assistant. The acknowledgment or negative acknowledgment information is denoted by "Y/N" in FIG. 2.

In 206, determining, by the server of the first voice assistant, information of the second voice assistant from the server returning the acknowledgment information. Only aspects of the client and the server of the second voice assistant are shown in FIG. 2, and the other voice assistants are not shown.

This step is actually the process of determining the target voice assistant which is referred to as the second voice assistant in this embodiment. if there is only one server of the other voice assistant which returns the acknowledgment information, the information of the voice assistant corresponding to the server is directly determined as the information of the second voice assistant, for example, the information may be embodied as the identification, the name, or the like, of the second voice assistant.

If there are a plurality of servers of the other voice assistants which return the acknowledgment information, the information of the voice assistant corresponding to one of the servers may be selected as the information of the second voice assistant. The one server may be selected at random or according to a preset priority order. The setting policy of the priority order is not limited in the present application.

In addition, if none of the servers of all the voice assistants returns the acknowledgment information, the server of the first voice assistant may respond to the text request by itself.

In 207, sending, by the server of the first voice assistant, the text request and the information of the second voice assistant to the client of the first voice assistant.

In 208, according to the information of the second voice assistant, calling, by the client of the first voice assistant, the client of the second voice assistant to respond to the text request.

If the server of the first voice assistant distributes the text request based on the cooperative relationship in step 204, the selected second voice assistant may face the problem that the second voice assistant is not installed in the terminal device where the client of the first voice assistant is located, and in this case, the client of the first voice assistant may fail to call, and at this moment, the client of the first voice assistant may return information indicating that the voice request is unable to be processed to the user.

Based on the above-mentioned situation, in the above-mentioned step 204, it is preferable that the server of the first voice assistant distributes the text request and selects the information of the second voice assistant based on the information list of the voice assistants uploaded by the client of the first voice assistant. Thus, the second voice assistant is certainly installed in the terminal device, and when calling the client of the second voice assistant, the client of the first voice assistant transfers the text request to the client of the second voice assistant. The call between the clients of the two voice assistants may adopt an interprocess communication mode, which is not the focus of the present application and not described in detail here.

In 209, sending, by the client of the second voice assistant, the text request to the server of the second voice assistant.

In 210, responding to the text request by the server of the second voice assistant, and returning the response result to the client of the second voice assistant.

The responding to the text request at least includes: parsing the text request to obtain the task instruction. Further, the server of the second voice assistant may directly execute a corresponding task processing operation according to the task instruction, and return a processing result to the client of the second voice assistant. Or, a client of a non-voice assistant executing the task instruction may be determined, and information of the client of the non-voice assistant is returned to the client of the second voice assistant along with the text request, such that the client of the second voice assistant calls the client of the non-voice assistant to execute the task instruction. The server of the second voice assistant may respond to the text request in a response way in the prior art, which is not limited in the present application.

That is, the server of the second voice assistant performs parsing and subsequent processing operations on the text request according to a parsing policy in the specialized field, thereby completing the catching and performing links. Moreover, the whole processing process of the text request by the second voice assistant is invisible to the first voice assistant, and the first voice assistant only knows that the second voice assistant is able to process the text request, but does not know how the second voice assistant processes the text request, which maintains the independence between the two voice assistants.

In addition, in order to further enhance the security of the above-mentioned solution, an authentication process based on a token may be executed additionally, which is described in detail below in conjunction with FIG. 3.

Figures 3, 4A:
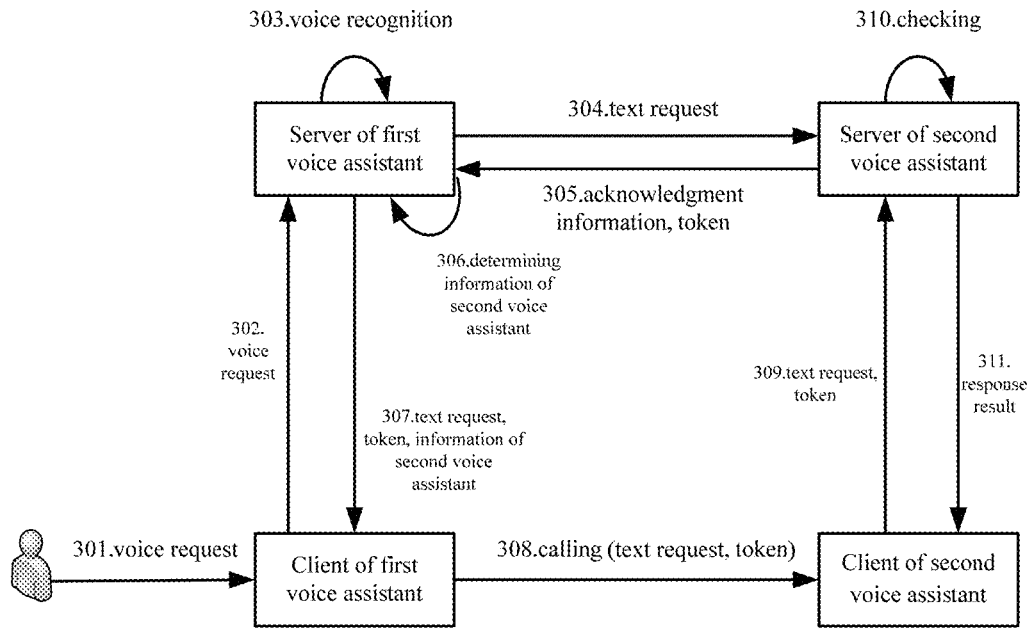
FIG. 3 is a flow chart of an improved method according to an embodiment of the present application.
FIGS. 4a-4b are diagrams of a first example of an interface according to the present application.

FIG. 3 is a flow chart of an improved method according to an embodiment of the present application, and as shown in FIG. 3, the method may include the following steps:

steps 301 to 304 which are the same as steps 201 to 204 in FIG. 2.

In 305, after determining that the server of each other voice assistant is able to process the text request, generating a token for the text request, and returning acknowledgment information and the token to the server of the first voice assistant.

In this step, the token may be generated by encrypting random information using a key and an encryption method known only to the server, so as to obtain the token, as long as the uniqueness of the token in the validity period is guaranteed and the token is difficult to crack by other devices.

In 306, determining, by the server of the first voice assistant, information of the second voice assistant from the server returning the acknowledgment information. This step is the same as step 206 in FIG. 2, and detailed reference is made to the related description of step 206 in FIG. 2.

In 307, sending, by the server of the first voice assistant, the text request, the token and the information of the second voice assistant to the client of the first voice assistant.

In 308, according to the information of the second voice assistant, calling, by the client of the first voice assistant, the client of the second voice assistant to respond to the text request, and transferring the text request and the token during the call.

In this step, when the client of the first voice assistant calls the client of the second voice assistant, transferred parameters include the above-mentioned token in addition to the text request.

In 309, sending, by the client of the second voice assistant, the text request and the token to the server of the second voice assistant.

In 310, checking, by the server of the second voice assistant, the text request with the token, and if the check is passed, responding to the text request.

In this step, the server of the second voice assistant may perform the check using the received token and the token generated for the text request to determine whether the two tokens are consistent, and if yes, the check is passed, otherwise, the check fails.

If the check is passed, the server of the second voice assistant responds to the text request.

If the check fails, the server of the second voice assistant does not respond to the text request, or returns check failure or response failure information to the client of the second voice assistant.

The above-mentioned token-based check may prevent a false response caused by an error call of the client of the second voice assistant by the client of the first voice assistant, and may also prevent the client of a malicious first voice assistant from calling the client of the second voice assistant for an attack. For example, if the client of the malicious first voice assistant calls the client of the second voice assistant to send an offensive text request for multiple times, since the client of the malicious first voice assistant is unable to know the token, the server of the second voice assistant does not respond to the malicious text request.

In addition to being used for the check, the token may be used for at least one of frequency control and/or a charging operation in the present application.

When the token is used for frequency control, if the client of the second voice assistant frequently sends text requests and tokens to the server of the second voice assistant, but the check of the tokens fails, that is, if the number of the requests which are sent by the client of the second voice assistant and do not pass authentication exceeds a preset threshold within a set time, the client of the second voice assistant may be placed into a blacklist. The server of the second voice assistant discards all the requests sent by the client in the blacklist and does not respond. By such a frequency control way, malicious attack behaviors may be prevented.

When the token is used for the charging operation, the server of the second voice assistant counts the number of times of replacing the first voice assistant to respond to the text request by recording a corresponding relationship between the token and the first voice assistant, and use this result as a charging basis for the first voice assistant. Specifically, the server of the second voice assistant counts the number of responses corresponding to the first voice assistant in the responses to the text request based on the corresponding relationship, and charges the first voice assistant based on the number of responses.

In 311, returning the response result by the server of the second voice assistant to the client of the second voice assistant.

Two examples in which the above-mentioned method is adopted are listed below.

First Example

Figure 4B:
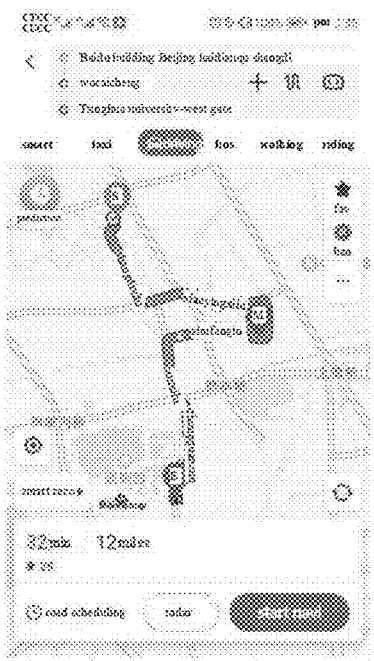

A user inputs a voice request "to wucaicheng first and then to Tsinghua university" using a client of a built-in voice assistant of an operating system of a mobile phone, as shown in FIG. 4a. The client of the voice assistant sends the voice request to a server. In addition, the client of the built-in voice assistant of the operating system sends an information list of voice assistants installed on the mobile phone to the server when started. After parsing the voice request into a text request, the server sends the text request to a server of each voice assistant in the information list of the voice assistants, for example, a server of a map application, a server of a video application, or the like. After the server of the map application determines that the server is able to process the text request, a token is generated for the text request, the token and acknowledgment information are returned to the server of the built-in voice assistant of the system of the mobile phone, and the server returns the text request, the information of the map application and the token to the client of the built-in voice assistant of the system of the mobile phone. The client of the built-in voice assistant of the system of the mobile phone calls a client of the map application and transfers the text request and the token to the client of the map application. The client of the map application sends the text request and the token to the server of the map application, and the server of the map application responds to the text request. Specifically, the text request is parsed into the task instruction of retrieving a route which has the Tsinghua University as a destination and passes the wucaicheng, and returning a route planning result to the client of the map application after the route is planned. The route planning result as shown in FIG. 4b is presented to the user by the client of the map application.

It may be seen that the user calls the client of the voice assistant of the mapping application from the client of the built-in voice assistant of the system of the mobile phone as shown in FIG. 4a, so as to present the route planning result which obviously meets requirements of the user more accurately compared with a response result of the built-in voice assistant of the system of the mobile phone.

Second Example

Figure 5A:
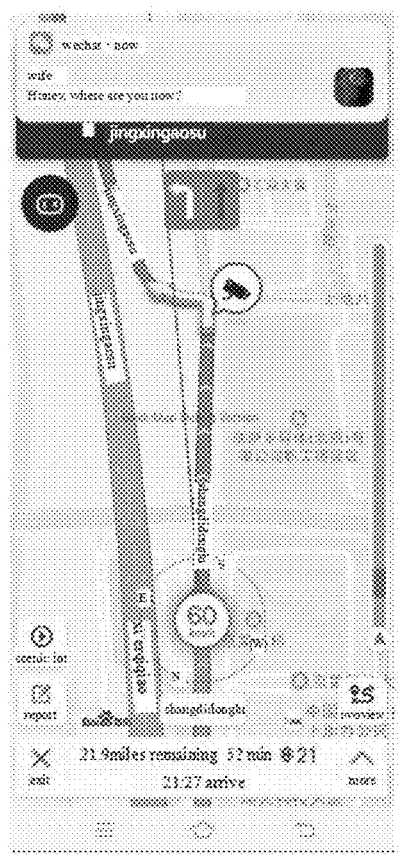
FIGS. 5a-5d are diagrams of a second example of the interface according to the present application.
Figure 5B:
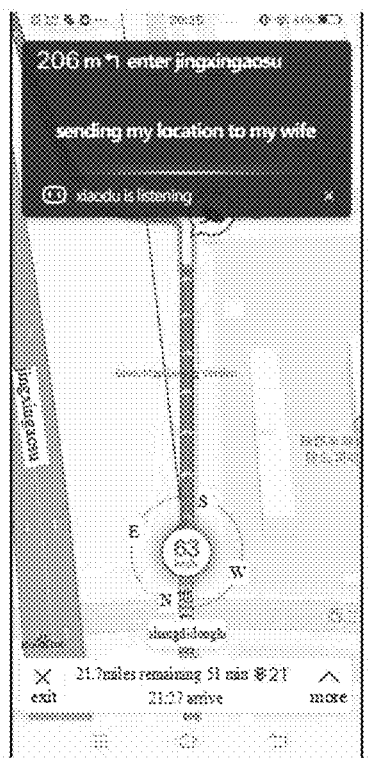
Figure 5C:
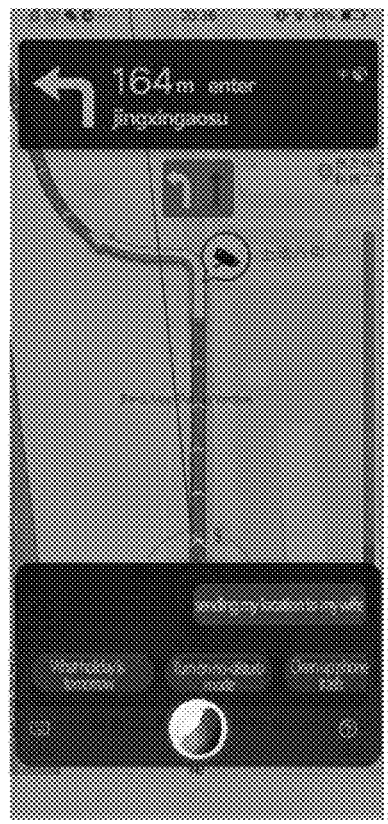
Figure 5D:
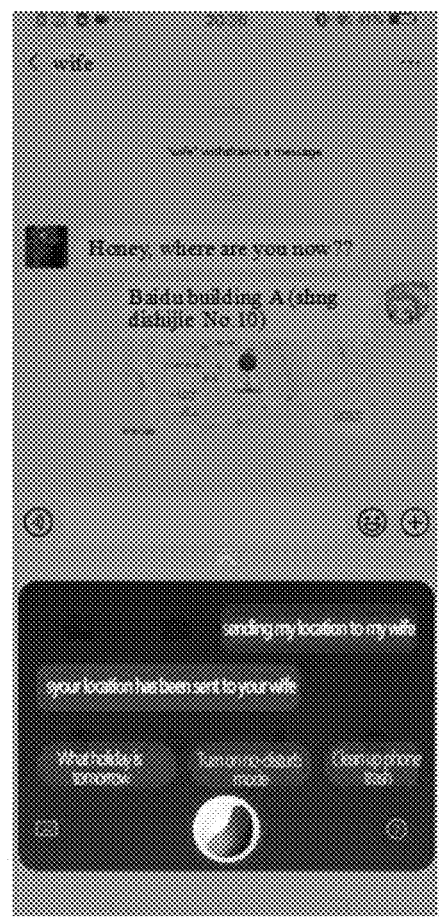

When using the client of the map application, the user receives a short message from his wife inquiring about location information, as shown in FIG. 5a. The user inputs a voice request "sending my location to wife" with the voice assistant function at the client of the map application, as shown in FIG. 5b. The client of the map application sends the voice request and the information list of the voice assistants installed on the mobile phone to the server of the map application, and the server of the map application recognizes the voice request and distributes a recognized text request to the server of each voice assistant according to the information list of the voice assistants. If the built-in voice assistant of the system of the mobile phone returns acknowledgment information and a token, the server of the map application sends the text request, information of the built-in voice assistant of the system of the mobile phone and the token to the client of the map application. The client of the map application calls the client of the built-in voice assistant of the system of the mobile phone and transfers the text request and the token, as shown in FIG. 5c. The client of the built-in voice assistant of the system of the mobile phone sends the text request and the token to the server, and the server parses the text request into the task instruction of calling the WeChat client to send the location information to the wife. Then, the task instruction is returned to the client of the built-in voice assistant of the system of the mobile phone. The client of the built-in voice assistant of the system of the mobile phone calls the WeChat client and transfers the task instruction of "sending the location information to the wife", and then, the WeChat client executes the task instruction and sends the current location information to the wife, as shown in FIG. 5d.

It may be seen that after the user realizes the catching link and determines the target voice assistant from the client of the voice assistant of the map application shown in FIG. 5a, the client of the built-in voice assistant of the operating system is called to realize the understanding link and the performing link, and then, the client of the voice assistant of the operating system calls the WeChat to finally fulfill the voice request of the user. Demands of the user are unable to be met only by the client of the voice assistant of the map application.

The methods according to the present application are described above, and apparatuses according to the present application will be described below in detail in conjunction with embodiments.

Figure 6:
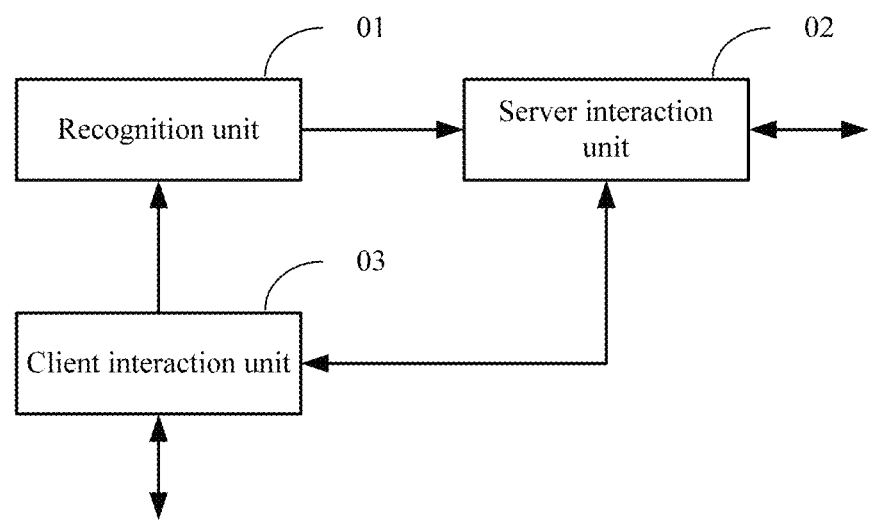
FIG. 6 is a schematic diagram of an apparatus for processing voices provided at a server of a first voice assistant according to an embodiment of the present application.

FIG. 6 is a schematic diagram of an apparatus for processing voices provided at a server of a first voice assistant according to an embodiment of the present application, and the apparatus may be configured as an application located on the server of the first voice assistant, or as a functional unit, such as a plug-in or software development kit (SDK) located in an application of the server of the first voice assistant. As shown in FIG. 6, the apparatus includes a recognition unit 01, a server interaction unit 02 and a client interaction unit 03. The main functions of each constitutional unit are as follows.

The client interaction unit 03 is configured to receive a voice request sent by a client of the first voice assistant.

The recognition unit 01 is configured to recognize the voice request received by the client interaction unit 03 to obtain a text request.

The server interaction unit 02 is configured to send the text request to a server of at least one other voice assistant; and determine information of a second voice assistant from the server of the other voice assistant which returns acknowledgment information, the acknowledgment information indicating that the server of the other voice assistant which sends the acknowledgment information is able to process the above-mentioned text request.

The client interaction unit 03 is further configured to send the text request and the information of the second voice assistant to a client of the first voice assistant, such that the client of the first voice assistant calls a client of the second voice assistant to respond to the text request.

Preferably, the server interaction unit 02 may be further configured to receive token information returned by a server of the second voice assistant for the above-mentioned text request. The token information may be returned along with the above-mentioned acknowledgment information.

The client interaction unit 03 is further configured to send the token information to the client of the first voice assistant, such that the client of the first voice assistant transfers the text request and the token information when calling the client of the second voice assistant. The above-mentioned token information may be returned to the client of the first voice assistant along with the acknowledgment information and information of the second voice assistant.

As a preferred implementation, the client interaction unit 03 may further receive an information list of voice assistants installed in a terminal device sent by the client of the first voice assistant. The client of the first voice assistant may scan the information list of the voice assistants installed in the terminal device when started and send the information list to the server of the first voice assistant, or may send the list of the voice assistants to the server of the first voice assistant along with the voice request.

Correspondingly, according to the received information list of the voice assistants, the server interaction unit 02 executes the operation of sending a text request recognized to a server of at least one other voice assistant.

In addition, the apparatus may further include a response processing unit (not shown) configured to judge whether the server of the first voice assistant is able to process the text request, if not, trigger the server interaction unit 02 to send the text request recognized to the server of the at least one other voice assistant, and if yes, respond to the text request and return a response result to the client of the first voice assistant.

When determining the information of the second voice assistant from the server of the other voice assistant which returns the acknowledgment information, the server interaction unit 02, if there is only one server of the other voice assistant which returns the acknowledgment information, determines the information of the voice assistant corresponding to the server as the information of the second voice assistant, and if there are a plurality of servers of the other voice assistants which return the acknowledgment information, selects the information of the voice assistant corresponding to one of the servers as the information of the second voice assistant.

Figure 7:
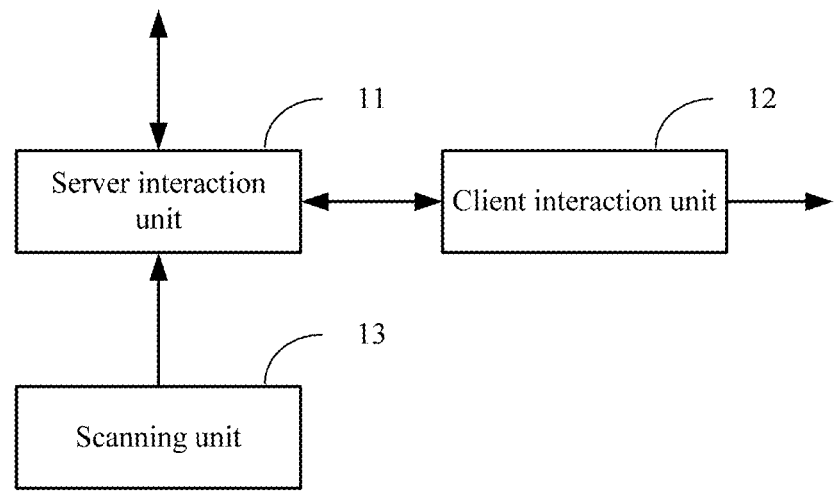
FIG. 7 is a schematic diagram of an apparatus for processing voices provided at a client of the first voice assistant according to an embodiment of the present application.

FIG. 7 is a schematic diagram of an apparatus for processing voices provided at a client of the first voice assistant according to an embodiment of the present application, and the apparatus may be configured as an application located on the client of the first voice assistant, or as a functional unit, such as a plug-in or SDK located in an application of the client of the first voice assistant. As shown in FIG. 7, the apparatus may include a server interaction unit 11 and a client interaction unit 12, and may further include a scanning unit 13. The main functions of each unit are as follows.

The server interaction unit 11 is configured to send a voice request input by a user to the server of the first voice assistant; and receive a text request which is returned by the server of the first voice assistant and obtained by recognizing the voice request and information of a second voice assistant which is able to process the text request.

The client interaction unit 12 is configured to call a client of the second voice assistant to respond to the text request by the client of the second voice assistant.

Preferably, the server interaction unit 11 may further receive token information returned by the server of the first voice assistant, the token information being generated by a server of the second voice assistant for the above-mentioned text request. The token information may be received along with the text request and the information of the second voice assistant.

Correspondingly, the client interaction unit 12 transfers the text request and the token information while calling the client of the second voice assistant.

The scanning unit 13 is configured to scan an information list of voice assistants installed in a terminal device where the client of the first voice assistant is located.

Correspondingly, the server interaction unit 11 sends the information list of the voice assistants to the server of the first voice assistant.

Figure 8:
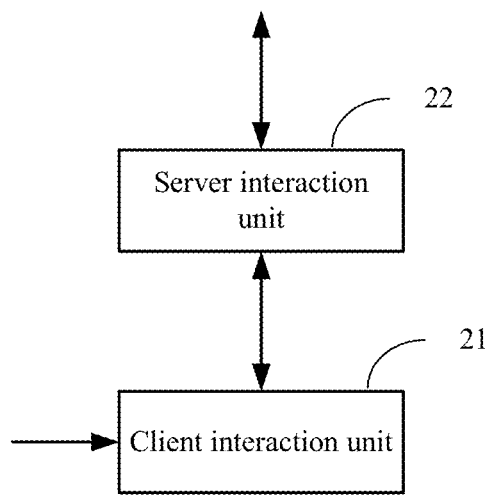
FIG. 8 is a schematic diagram of an apparatus for processing voices provided at a client of a second voice assistant according to an embodiment of the present application.

FIG. 8 is a schematic diagram of an apparatus for processing voices provided at a client of a second voice assistant according to an embodiment of the present application, and the apparatus may be configured as an application located on the client of the second voice assistant, or as a functional unit, such as a plug-in or SDK located in an application of the client of the second voice assistant. As shown in FIG. 8, the apparatus includes a client interaction unit 21 and a server interaction unit 22. The main functions of each constitutional unit are as follows.

The client interaction unit 21 is configured to receive a call from a client of a first voice assistant.

The server interaction unit 22 is configured to send a text request transferred by the call to a server of the second voice assistant; and receive a response result returned by the server of the second voice assistant for the text request.

Preferably, token information may also be transferred in the above-mentioned call; that is, when the client of the first voice assistant calls the client of the second voice assistant, transferred parameters include the text request and the token information.

Correspondingly, the server interaction unit 22 sends the token information along with the text request to the server of the second voice assistant, such that the server of the second voice assistant performs authentication using the token information.

Figure 9:
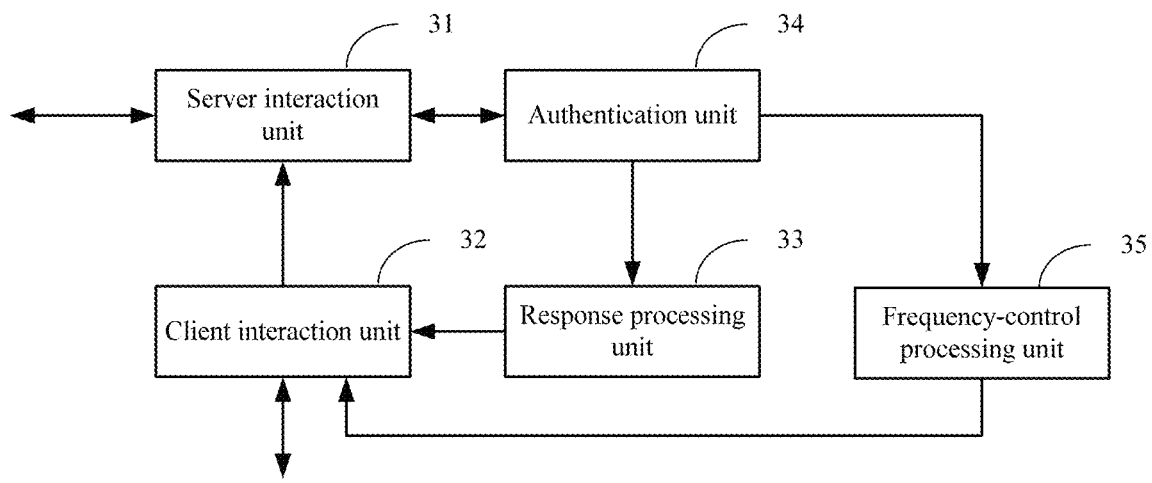
FIG. 9 is a schematic diagram of an apparatus provided at a server of the second voice assistant according to an embodiment of the present application.

FIG. 9 is a schematic diagram of an apparatus provided at a server of the second voice assistant according to an embodiment of the present application, and the apparatus may be configured as an application located on the server of the second voice assistant, or as a functional unit, such as a plug-in or SDK located in an application of the server of the second voice assistant. As shown in FIG. 9, the apparatus includes a server interaction unit 31, a client interaction unit 32 and a response processing unit 33, and may further include an authentication unit 34 and a frequency-control processing unit 35. The main functions of each constitutional unit are as follows.

The server interaction unit 31 is configured to receive a text request sent by a server of a first voice assistant, the text request being obtained by recognizing a voice request by the server of the first voice assistant; and return acknowledgment information to the server of the first voice assistant, the acknowledgment information indicating that the server of the second voice assistant is able to process the text request.

The client interaction unit 32 is configured to receive the text request sent by a client of the second voice assistant.

The response processing unit 33 is configured to respond to the text request.

The client interaction unit 32 is further configured to return a response result of the text request to the client of the second voice assistant.

The authentication unit 34 is configured to generate token information for the text request. The token information may be generated by encrypting random information using a key and an encryption method known only to the server of the second voice assistant, so as to obtain the token information, as long as the uniqueness of the token information in the validity period is guaranteed and the token information is difficult to crack by other devices.

Correspondingly, the server interaction unit 31 sends the token information to the server of the first voice assistant.

In this case, the client interaction unit 32 receives the token information along with the text request; before the response processing unit 33 responds to the text request, the authentication unit 34 performs authentication using the token information received by the client interaction unit 32 and the token information generated for the text request, and if the authentication is passed, triggers the response processing unit 33 to respond to the text request.

The authentication unit 34 may judge whether the token information received and the token information generated for the text request are consistent, and if yes, the check is passed, otherwise, the check fails. If the check fails, the client interaction unit 32 does not respond to the text request, or returns check failure or response failure information to the client of the second voice assistant.

The above-mentioned token-based check may prevent an error call of the client of the second voice assistant by the client of the first voice assistant, and may also prevent the client of a malicious first voice assistant from calling the client of the second voice assistant for an attack. For example, if the client of the malicious first voice assistant calls the client of the second voice assistant to send an offensive text request for multiple times, since the client of the malicious first voice assistant is unable to know the token, the server of the second voice assistant does not respond to the malicious text request.

In addition to being used for the check, the token may be used for at least one of frequency control and/or a charging operation in the present application.

The frequency-control processing unit 35 is configured to perform a frequency control operation on the client of the second voice assistant, and if the number of the requests which are sent by the client of the second voice assistant and do not pass authentication exceeds a preset threshold within a set time, the client of the second voice assistant is placed into a blacklist. The client interaction unit 32 directly discards requests from the client in the blacklist.

A charging unit (not shown) is configured to count the number of times of replacing the first voice assistant to respond to the text request by recording a corresponding relationship between the token and the first voice assistant, and use this result as a charging basis for the first voice assistant. Specifically, the number of responses corresponding to the first voice assistant in the responses to the text request may be counted based on the corresponding relationship; the first voice assistant may be charged based on the number of responses.

According to the embodiments of the present application, there are also provided an electronic device and a readable storage medium.

Figure 10:
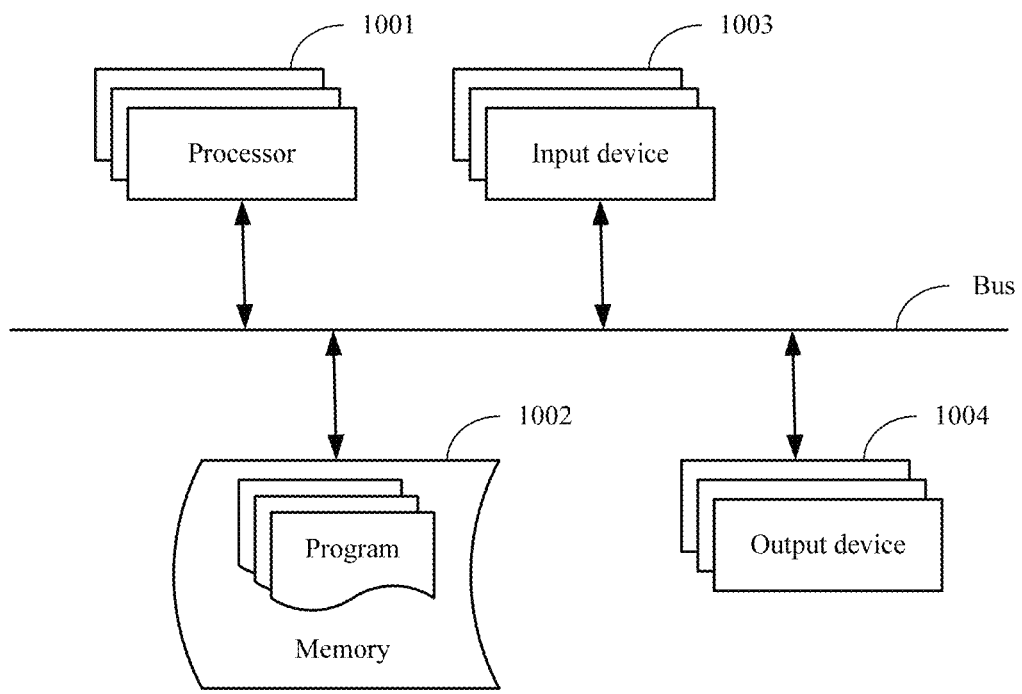
FIG. 10 is a block diagram of an electronic device configured to implement the methods for processing voices according to the embodiments of the present application.

FIG. 10 is a block diagram of an electronic device for the method for processing voices according to the embodiments of the present application. The electronic device is intended to represent various forms of digital computers, such as laptop computers, desktop computers, workstations, personal digital assistants, servers, blade servers, mainframe computers, and other appropriate computers. The electronic device may also represent various forms of mobile apparatuses, such as personal digital processors, cellular telephones, smart phones, wearable devices, and other similar computing apparatuses. The components shown herein, their connections and relationships, and their functions, are meant to be exemplary only, and are not meant to limit implementation of the present application described and/or claimed herein.

As shown in FIG. 10, the electronic device includes one or more processors 1001, a memory 1002, and interfaces configured to connect the various components, including high-speed interfaces and low-speed interfaces. The various components are interconnected using different buses and may be mounted at a common motherboard or in other manners as desired. The processor may process instructions for execution within the electronic device, including instructions stored in or at the memory to display graphical information for a GUI at an external input/output device, such as a display device coupled to the interface. In other implementations, plural processors and/or plural buses may be used with plural memories, if desired. Also, plural electronic devices may be connected, with each device providing some of necessary operations (for example, as a server array, a group of blade servers, or a multi-processor system). In FIG. 10, one processor 1001 is taken as an example.

The memory 1002 is configured as the non-transitory computer readable storage medium according to the present application. The memory stores instructions executable by the at least one processor to cause the at least one processor to perform a method for processing voices according to the present application. The non-transitory computer readable storage medium according to the present application stores computer instructions for causing a computer to perform the method for processing voices according to the present application.

The memory 1002 which is a non-transitory computer readable storage medium may be configured to store non-transitory software programs, non-transitory computer executable programs and modules, such as program instructions/modules corresponding to the method for processing voices according to the embodiments of the present application. The processor 1001 executes various functional applications and data processing of a server, that is, implements the method for processing voices according to the above-mentioned embodiments, by running the non-transitory software programs, instructions, and modules stored in the memory 1002.

The memory 1002 may include a program storage area and a data storage area, wherein the program storage area may store an operating system and an application program required for at least one function; the data storage area may store data created according to use of the electronic device for processing voices, or the like. Furthermore, the memory 1002 may include a high-speed random access memory, or a non-transitory memory, such as at least one magnetic disk storage device, a flash memory device, or other non-transitory solid state storage devices. In some embodiments, optionally, the memory 1002 may include memories remote from the processor 1001, and such remote memories may be connected to the electronic device for processing voices via a network. Examples of such a network include, but are not limited to, the Internet, intranets, local area networks, mobile communication networks, and combinations thereof.

The electronic device for the method for processing voices may further include an input device 1003 and an output device 1004. The processor 1001, the memory 1002, the input device 1003 and the output device 1004 may be connected by a bus or other means, and FIG. 10 takes the connection by a bus as an example.

The input device 1003 may receive input numeric or character information and generate key signal input related to user settings and function control of the electronic device for processing voices, such as a touch screen, a keypad, a mouse, a track pad, a touch pad, a pointing stick, one or more mouse buttons, a trackball, a joystick, or the like. The output device 1004 may include a display device, an auxiliary lighting apparatus (for example, an LED) and a tactile feedback apparatus (for example, a vibrating motor), or the like. The display device may include, but is not limited to, a liquid crystal display (LCD), a light emitting diode (LED) display, and a plasma display. In some implementations, the display device may be a touch screen.

Various implementations of the systems and technologies described here may be implemented in digital electronic circuitry, integrated circuitry, ASICs (application specific integrated circuits), computer hardware, firmware, software, and/or combinations thereof. These various implementations may be implemented in one or more computer programs which are executable and/or interpretable on a programmable system including at least one programmable processor, and the programmable processor may be special or general, and may receive data and instructions from, and transmitting data and instructions to, a storage system, at least one input device, and at least one output device.

These computer programs (also known as programs, software, software applications, or codes) include machine instructions for a programmable processor, and may be implemented using high-level procedural and/or object-oriented programming languages, and/or assembly/machine languages. As used herein, the terms "machine readable medium" and "computer readable medium" refer to any computer program product, device and/or apparatus (for example, magnetic discs, optical disks, memories, programmable logic devices (PLDs)) for providing machine instructions and/or data to a programmable processor, including a machine readable medium which receives machine instructions as a machine readable signal. The term "machine readable signal" refers to any signal for providing machine instructions and/or data to a programmable processor.

To provide interaction with a user, the systems and technologies described here may be implemented on a computer having: a display apparatus (for example, a CRT (cathode ray tube) or LCD (liquid crystal display) monitor) for displaying information to a user; and a keyboard and a pointing apparatus (for example, a mouse or a trackball) by which a user may provide input to the computer. Other kinds of apparatuses may also be used to provide interaction with a user; for example, feedback provided to a user may be any form of sensory feedback (for example, visual feedback, auditory feedback, or tactile feedback); and input from a user may be received in any form (including acoustic, voice or tactile input).

The systems and technologies described here may be implemented in a computing system (for example, as a data server) which includes a back-end component, or a computing system (for example, an application server) which includes a middleware component, or a computing system (for example, a user computer having a graphical user interface or a web browser through which a user may interact with an implementation of the systems and technologies described here) which includes a front-end component, or a computing system which includes any combination of such back-end, middleware, or front-end components. The components of the system may be interconnected through any form or medium of digital data communication (for example, a communication network). Examples of the communication network include: a local area network (LAN), a wide area network (WAN) and the Internet.

A computer system may include a client and a server. Generally, the client and the server are remote from each other and interact through the communication network. The relationship between the client and the server is generated by virtue of computer programs which are run on respective computers and have a client-server relationship to each other.

Some embodiments of the above-mentioned application have at least the following advantages.

1) In the present application, after receiving the voice request, the first voice assistant is only responsible for recognizing the voice request to obtain the text request, and calls the second voice assistant which is able to process the text request to respond to the text request, such that when the first voice assistant is not specialized in some fields, the second voice assistant which is specialized in the fields may be called to perform a specific response processing operation, thereby meeting user requirements more accurately.

2) A token-based checking mechanism provided by the server of the second voice assistant may prevent a false response caused by an error call of the client of the second voice assistant by the client of the first voice assistant, and may also prevent the client of a malicious first voice assistant from calling the client of the second voice assistant for an attack, thereby improving reliability and safety.

3) The server of the second voice assistant may use a token to perform a frequency control processing operation, which may prevent malicious attacks caused when an illegal client counterfeits a request.

4) The server of the second voice assistant may count the number of times of replacing the first voice assistant to respond to the text request by recording a corresponding relationship between the token and the first voice assistant, and use this result as a charging basis for the first voice assistant.

It should be understood that various forms of the flows shown above may be used and reordered, and steps may be added or deleted. For example, the steps described in the present application may be executed in parallel, sequentially, or in different orders, and are not limited herein as long as the desired results of the technical solution disclosed in the present application may be achieved.

The above-mentioned embodiments are not intended to limit the scope of the present application. It should be understood by those skilled in the art that various modifications, combinations, sub-combinations and substitutions may be made, depending on design requirements and other factors. Any modification, equivalent substitution and improvement made within the spirit and principle of the present application all should be included in the extent of protection of the present application.

What is claimed is:

1. A method for processing voices, comprising:
   recognizing, by a server of a first voice assistant, a voice request received by the server of the first voice assistant;
   sending a text request obtained by the recognition to one or more a-respective servers of one or more other voice assistants;
   determining information of a second voice assistant from at least one respective server of at least one other voice assistant of the one or more other voice assistants which returns acknowledgment information, the acknowledgment information indicating that the at least one respective server of the at least one voice assistant which returns the acknowledgment information is able to process the text request; and sending the text request and the information of the second voice assistant to a client of the first voice assistant, such that the client of the first voice assistant calls a client of the second voice assistant to respond to the text request.

2. The method according to claim 1, further comprising:
receiving token information returned by a server of the second voice assistant for the text request; and
sending the token information to the client of the first voice assistant, such that the client of the first voice assistant transfers the text request and the token information when calling the client of the second voice assistant.

3. The method according to claim 1, further comprising:
receiving an information list of voice assistants installed in a terminal device sent by the client of the first voice assistant; and
according to the information list of the voice assistants, performing the sending the text request obtained by the recognition to the one or more respective servers of the one or more other voice assistants.

4. The method according to claim 1, further comprising: before sending the text request obtained by the recognition to the one or more respective servers of the one or more other voice assistants,
judging whether the server of the first voice assistant is able to process the text request, if the server of the first voice assistant is not able to process the text request, proceeding to the sending the text request to the one or more respective servers of the one or more other voice assistants, and if the server of the first voice assistant is able to process the text request, responding to the text request and returning a response result to the client of the first voice assistant.

5. The method according to claim 1, wherein the determining information of the second voice assistant from the at least one respective server of the at least one other voice assistant of the one or more other voice assistants which returns acknowledgment information comprises:
if there is only one server of one other voice assistant which returns the acknowledgment information, determining information of the one other voice assistant corresponding to the one server as the information of the second voice assistant; and
if there are a plurality of respective servers of a plurality of other voice assistants which return the acknowledgment information, selecting information of one other voice assistant corresponding to one of the plurality of respective servers as the information of the second voice assistant.

6. A server of a first voice assistant, comprising:
at least one processor; and
a memory connected with the at least one processor communicatively;
wherein the memory stores instructions executable by the at least one processor to cause the at least one processor to carry out a method for processing voices, which comprises:
recognizing, by the server of the first voice assistant, a voice request received by the server of the first voice assistant;
sending a text request obtained by the recognition to a-one or more respective servers of one or more other voice assistants;

determining information of a second voice assistant from at least one respective server of at least one other voice assistant of the one or more other voice assistants which returns acknowledgment information, the acknowledgment information indicating that the at least one respective server of the at least one other voice assistant which returns the acknowledgment information is able to process the text request; and
sending the text request and the information of the second voice assistant to a client of the first voice assistant, such that the client of the first voice assistant calls a client of the second voice assistant to respond to the text request.

7. The server of the first voice assistant according to claim 6, wherein the method further comprises:
receiving token information returned by a server of the second voice assistant for the text request; and
sending the token information to the client of the first voice assistant, such that the client of the first voice assistant transfers the text request and the token information when calling the client of the second voice assistant.

8. A method for processing voices, comprising:
receiving, by a server of a first voice assistant, a voice request from a client of a first voice assistant;
recognizing, by the server of the first voice assistant, the voice request to obtain a text request;
sending, by the server of the first voice assistant, the text request to one or more respective servers of one or more other voice assistants;
determining, by the server of the first voice assistant, an identifier of a second voice assistant from at least one respective server of at least one other voice assistant of the one or more other voice assistants which returns acknowledgement information, the acknowledgement information indicating that the at least one respective server of the at least one other voice assistant which returns the acknowledgement information is able to process the text request; and
sending, by the server of the first voice assistant, the text request and the identifier of the second voice assistant to the client of the first voice assistant;
calling, by the client of the first voice assistant, a client of the second voice assistant determined according to the identifier of the second voice assistant by transferring the text request to the client of the second voice assistant;
sending, by the client of the second voice assistant, the text request to a server of the second voice assistant;
receiving, by the client of the second voice assistant, a response result returned from the server of the second voice assistant for the text request;
wherein the client of the first voice assistant and the client of the second voice assistant are located in a same terminal device, and
wherein, the terminal device, the server of the first voice assistant and the at least one respective server of the at least one other voice assistant communicate with each other via network.

9. The method according to claim 8, further comprising:
receiving, by the server of the first voice assistant, token information returned by the server of the second voice assistant for the text request;
sending, by the server of the first voice assistant, the token information to the client of the first voice assistant;
transferring, by the client of the first voice assistant, the token information along with the text request, to the client of the second voice assistant when calling the client of the second voice assistant;

sending, by the client of the second voice assistant, the token information along with the text request to the server of the second voice assistant; and performing, by the server of the second voice assistant, authentication using the token information.

10. The method according to claim 8, further comprising:

receiving, by the server of the first voice assistant, an information list of voice assistants installed in the terminal device sent by the client of the first voice assistant; and according to the information list of the voice assistants, determining a server of at least one other voice assistant to which the text request is to be sent.

11. The method according to claim 8, further comprising: before sending the text request obtained by the recognition to the one or more respective servers of the one or more other voice assistants, judging, by the server of the first voice assistant, whether the server of the first voice assistant is able to process the text request, if the server of the first voice assistant is not able to process the text request, proceeding to the sending the text request to the one or more respective servers of the one or more other voice assistants, and if the server of the first voice assistant is able to process the text request, responding to the text request and returning a response result to the client of the first voice assistant.

12. A system for processing voices, comprising a plurality of clients of voice assistants located in a same terminal device including a client of a first voice assistant and a client of a second voice assistant, and a plurality of servers of voice assistants including a server of the first voice assistant and a server of the second voice assistant, and wherein the terminal device and the servers communicate with each other via network:

wherein the server of the first voice assistant is configured to:

receive a voice request from the client of the first voice assistant;

recognize the voice request to obtain a text request; and send the text request to one or more respective servers of one or more other voice assistants;

determine an identifier of the second voice assistant from at least one respective server of at least one other voice assistant of the one or more other voice assistants which returns acknowledgement information, the acknowledgement information indicating that the at least one respective server of the at least one other voice assistant which returns the acknowledgement information is able to process the text request;

send the text request and the identifier of the second voice assistant to the client of the first voice assistant;

wherein the client of the first voice assistant is configured to:

send the voice request to the server of the first voice assistant;

receive the text request and the identifier of the second voice assistant from the server of the first voice assistant; and call the client of the second voice assistant by transferring the text request to the client of the second voice assistant;

wherein the client of the second voice assistant is configured to:

receive the call from the client of the first voice assistant; and send the text request transferred by the call to the server of the second voice assistant; and receive a response result returned by the server of the second voice assistant for the text request;

wherein the server of the second voice assistant is configured to:

receive the text request sent by the server of the first voice assistant;

return acknowledgement information to the server of the first voice assistant, the acknowledgement information indicating that the server of the second voice assistant is able to process the text request;

receive the text request sent by the client of the second voice assistant; and respond to the text request; and return a response result of the text request to the client of the second voice assistant.

13. The system according to claim 12, wherein the server of the first voice assistant is further configured to:

receive token information returned by the server of the second voice assistant for the text request;

send the token information to the client of the first voice assistant;

wherein the client of the first voice assistant is further configured to:

receive the token information from the server of the first voice assistant;

transfer the token information along with the text request to the client of the second voice assistant when calling the client of the second voice assistant;

wherein the client of the second voice assistant is further configured to:

send the token information along with the text request to the server of the second voice assistant; and wherein the server of the second voice assistant is further configured to:

generate the token information for the text request received from the server of the first voice assistant and send the token information along with the acknowledgement information to the server of the first voice assistant; and perform authentication using the token information upon receiving the token information along with the text request from the client of the second voice assistant.

14. The system according to claim 12, wherein the client of the first voice assistant is further configured to:

send an information list of voice assistants installed in the terminal device to the server of the first voice assistant;

wherein the server of the first voice assistant is further configured to:

receive the information list of the voice assistants, and determine a server of at least one other voice assistant to which the text request is to be sent according to the information list of the voice assistants.

\* \* \* \* \*